United States Patent [19]

Le Roux

[11] Patent Number: 5,563,400
[45] Date of Patent: Oct. 8, 1996

[54] MULTI-APPLICATIONS PORTABLE CARD FOR PERSONAL COMPUTER

[75] Inventor: Jean-Yves Le Roux, La Ciotat, France

[73] Assignee: Gemplus Card International, Gemenos, France

[21] Appl. No.: 321,679

[22] Filed: Oct. 12, 1994

[51] Int. Cl.⁶ .................................................. G06K 7/00
[52] U.S. Cl. ........................................ 235/486; 439/75
[58] Field of Search ............................. 235/486, 441, 235/380, 382, 385, 383, 492; 439/299, 300, 75

[56] References Cited

U.S. PATENT DOCUMENTS

| | | | |
|---|---|---|---|
| 5,049,728 | 9/1991 | Rovin | 235/492 |
| 5,191,193 | 3/1993 | LeRoux | 235/379 |
| 5,212,369 | 5/1993 | LeRoux | 235/380 |
| 5,227,612 | 7/1993 | LeRoux | 235/379 |
| 5,296,692 | 3/1994 | Shino | 235/486 |
| 5,334,030 | 8/1994 | Brilliott | 439/75 |
| 5,430,617 | 7/1995 | Hsu | 361/818 |
| 5,436,621 | 7/1995 | Macko et al. | 40/225.44 |

FOREIGN PATENT DOCUMENTS

| | | | |
|---|---|---|---|
| 0549983 | 7/1993 | European Pat. Off. | 235/486 |
| 0028892 | 2/1987 | Japan | 235/486 |
| 3141486 | 6/1991 | Japan | 235/486 |
| 3194680 | 8/1991 | Japan | 235/486 |
| 8912288 | 12/1989 | WIPO | 235/486 |

*Primary Examiner*—John Shepperd
*Assistant Examiner*—Thien Minh Le
*Attorney, Agent, or Firm*—Nilles & Nilles, S.C.

[57] ABSTRACT

A multi-applications portable card that can be plugged in notably into a reader of a personal computer comprises a first connector designed for a connection with the reader and positioned on the periphery of a pack. The portable card comprises, firstly, a mobile rack positioned on an edge of the card that gets fitted into a cavity of the pack, the mobile rack further including a housing provided with a bottom and designed to receive a chip borne by a token and, secondly, a second connector electronically linked to the first connector. The disclosed device can be applied in particular to PCMCIA cards.

37 Claims, 3 Drawing Sheets

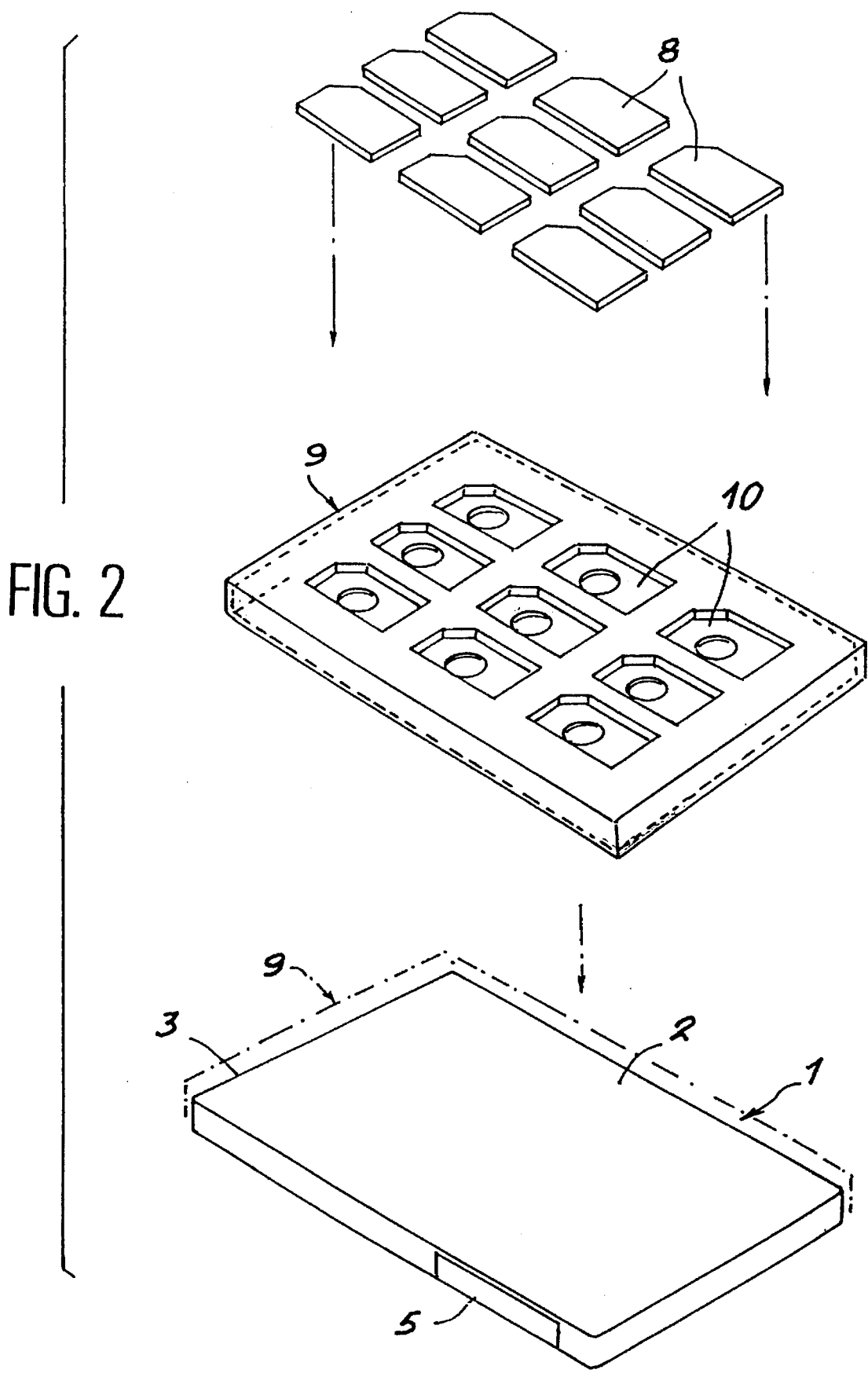

MULTI-APPLICATIONS PORTABLE CARD FOR PERSONAL COMPUTER

BACKGROUND OF THE INVENTION

1. Field of the Invention

The invention relates to multi-applications portable cards designed to be inserted temporarily into a card reader forming part notably of a micro-computer or PC (personal computer). It relates more particularly to 68-pin PCMIA format cards standardized by the Personal Computer Memory Card International Association, 1030B East Duane Avenue, Sunnyvale, Calif.

2. Description of the Prior Art

These cards could, in the near future, replace diskettes or other magnetic type mass storage means as well as chip-card type portable electronic cards.

Indeed, their high mass-storage memory capacity (in the range of some millions of bytes), their compactness (in the range of 5 cm×8 cm for a thickness of 3 mm) and their speed of access which is substantially higher than that of magnetic diskettes make them an ideal information medium.

However, for reasons related to the constitution of the magnetic medium used, the PCMCIA cards are not secure. The information that they contain is considerably more accessible than the information that would be contained notably in a chip card.

In order to overcome this drawback, it was first of all proposed to introduce a standard chip card into a PCMCIA card, by making a connection between the chip of the chip card and the data-processing system of the PCMCIA card. An approach such as this is described, for example, in the French patent application published under No. 2 686 172.

However, this attractive solution is a limited one. Indeed, the presently used chip cards are designed only for one application since, although a chip can, in theory, contain a quantity of information sufficient for several applications, the development of the multi-application chip cards makes it necessary for the different suppliers to arrive at agreements that are practically impossible to obtain in the present economic context.

The idea then arose of positioning several chip cards with the PCMIA chip card of the type described in the above-mentioned patent application. However, this approach is not viable since, with a standard chip card being 0.8 mm thick, the use for example of nine chip cards with a PCMCIA card such as this would result in a unit whose minimum thickness would be about 9×0.8 mm 3 mm=10.2 mm. This is considerable for a so-called portable card that would have to fit into a coat pocket.

Furthermore, a U.S. Pat. No. 5,049,728, has proposed the use of multiple-chip cards. However, this approach cannot be envisaged because the body of these cards is very complicated to make, and it is difficult to handle the chips thereon.

It is an object of the present invention to overcome these drawbacks related to connection and complexity of handling by proposing a PCMCIA card with a rack capable of receiving a card such as this.

SUMMARY OF THE INVENTION

According to the invention this aim, and others that shall appear hereinafter, are achieved by means of a multi-applications portable card that can be plugged in notably into a reader of a personal computer, said card comprising a first connector designed for a connection with said reader and positioned on the periphery of a pack, wherein said card comprises, firstly, a mobile rack positioned on an edge of the card that gets fitted into a cavity of the pack, comprising a housing provided with a bottom and designed to receive a chip borne by a token and, secondly, a second connector electronically linked to the first connector.

According to another characteristic of the invention, portable cards such as these advantageously comprise a lid provided with receptacles designed to receive the tokens.

BRIEF DESCRIPTION OF THE DRAWINGS

The following description, which is in no way restrictive, will provide for a clearer understanding of the way in which the present invention can be implemented.

It must be read in relation to the appended drawings, of which:

FIG. 2 illustrates the superimposition, on a portable card according to the invention, of a lid with receptacles and of a set of tokens.

MORE DETAILED DESCRIPTION

The invention can be applied more particularly to PCMCIA-format portable cards referenced 1 in the set of figures.

The PCMCIA-format cards form a parallelepiped-shaped, rectangular pack 2 whose dimensions are substantially equal to 5 cm×8 cm with a thickness of about 3 mm. This pack 2 may comprise a micro-processor and a mass storage memory.

A first standardized, 68-pin female connector 3 is positioned on the periphery of the pack 2 on one of its first sides, with a view to being plugged into a corresponding male connector of a personal computer.

Figure 1A:
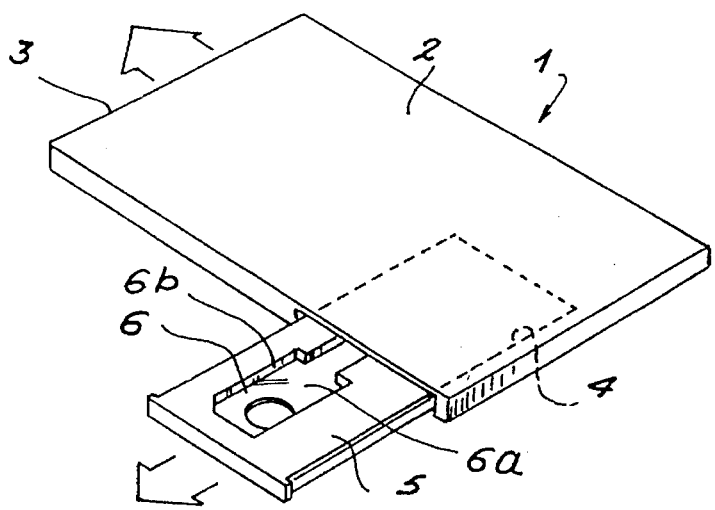
FIGS. 1A, 1B, 1C and 1D show the opening of the rack of the portable card, the placing of the token in this rack and its closing, FIGS. 1B and 1D being two different embodiments of the present invention.
Figures 1B, 1D:
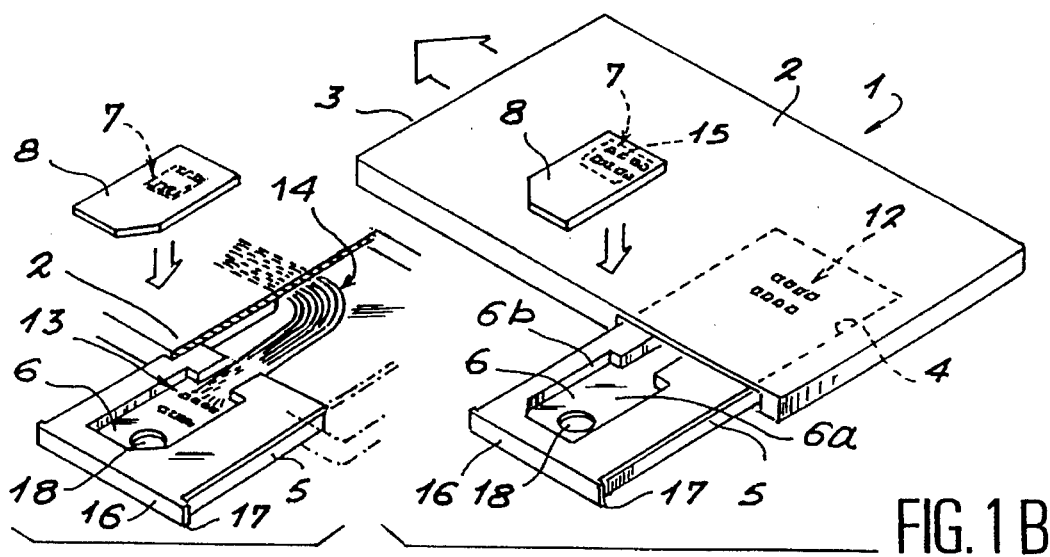
Figure 1C:
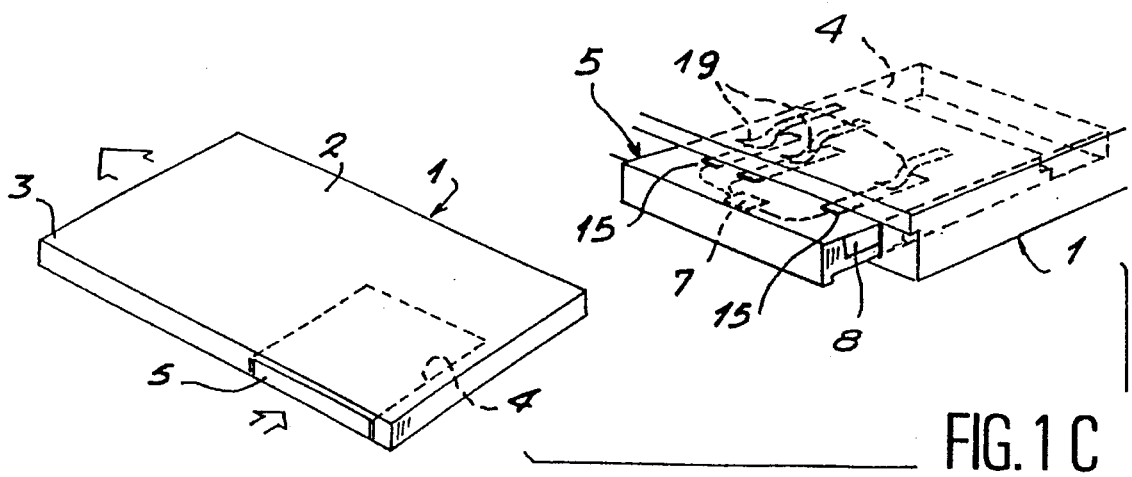

The cavity 4, shown by dashes in FIGS. 1A, 1B and 1C, is made in the PCMCIA card and opens out on the edge of this card, at one of the sides not used by the connector 3. Preferably, this side is a large side of the PCMCIA card.

This cavity 4 is designed to receive a rack 5 shown in the opened position in FIGS. 1A and 1B, and in the closed position in FIG. 1C.

The rack 5 is solid except at the position of a housing or recess referenced 6 as a whole. This housing 6 has a bottom 6a and substantially vertical edges 6b, advantageously having a slight taper. The bottom of the rack 5 is actually the bottom 6a of the housing 6. Chips 7 with contacts flush with the surface may be deposited in the housing 6. These contacts are of the type found typically in the chip cards used chiefly for security of access to various premises, for banking transactions or for the provision of services such as telephone communications. In the case of the invention, the chips themselves are each positioned on a token 8 with a format smaller than the chip-card format.

The housing 6 then advantageously takes the shape of the tokens 8. These tokens are contained, for example, within a parallelepiped about 15 mm wide, 25 mm long and 0.8 mm thick. One of the corners is cut to enable an accurate orientation of the token 8 or of the chip 7 with respect to the rack 5.

Naturally, the framework of the invention is not limited solely to portable cards comprising a single cavity 4 provided with a rack 5, but it further comprises portable cards having several cavities, each provided with a rack 5. The number of pins of the PCMCIA card can allow such a variant, since the chips generally have eight contacts at most. In this case, a microprocessor contained, if necessary, in the PCMCIA card may even carry out a multiplexing between the chips connected in the racks.

Furthermore, the portable cards of the invention include a second connector designed to set up a connection between the eight contact pads, flush with the surface, that are conventionally contained in a chip and the active elements of the PCMCIA card and between these active elements of the PCMCIA card and the first 68-pin connector. This second connector therefore has eight conductive wires connected either directly to the 68-pin conductor or to an interface that is managed by the microprocessor of the card and that carries out notably a protocol conversion between signals received or sent out by the chip and signals recognized by the personal computer.

The second connector is positioned, as required, in the cavity 4 as represented in the right-hand part of FIG. 1B or at the bottom of the rack 5, in the housing 6, as shown in FIG. 1D.

If it is positioned in the cavity 4, it is placed against a ceiling of this cavity. The token 8 is then oriented, in the rack 5, with metallisations 15 of the chip 7 pointed upwards. The representation of the second connector in FIG. 1B is then referenced 12. The connector 12 may, in this case, be fixed. The contact with the chip 7 is formed as soon as the rack 5 is closed, by a very precise adjusting and with contact pads of the second connector comprising flexible parts. These are flexible parts such as, for example, contacts forming metal and elastic strips referenced 19 in FIG. 1C, on the right-hand side, which shows a longitudinal side of the rack 5 fitted into in the card 1. The second connector may also be mobile. In this case, the closing of the rack 5 causes a shifting of the contact pads of the second connector towards the chip. The former example is simple to make but the chip 7 may be scratched by repeated contacts with the strips of the connector 12. The latter example does not have this drawback, but is mechanically more difficult to make. However, the latter type of structure is possible. By virtue of its principle, it is the structure implemented in known chip-card connectors of the so-called landing type.

On the contrary, if the second connector is positioned on the rack 5, it is fixed to the bottom of the housing 6. Its representation in FIG. 1D is then referenced 13. In this embodiment, the token 8 has to be deposited with the connector of the chip 7 pointed downwards. The second connector is then connected to flexible conductive wires 14 that are long enough to enable an opening and closing of the rack 5, without strains. In this case, the cavity 4 has, at the bottom, a vacant space to receive the strands of the connection wires when the rack is in a closed position. In practice, these wires exert a force that tends naturally to open the rack. This approach is particularly useful because the chip 7 then will not be scratched by the connector 13, and this connector is simple to make as compared with a mobile connector. When the PCMCIA card is positioned in the reader of the microcomputer, the side walls of the insertion slot of this reader advantageously exert a holding force on the stop 16 mounted at the end of this rack, in order to keep it closed. Preferably, the stop 16 has a chamfer 17 in its front, in the direction of insertion, to further the engagement of the rack 5. It is also possible to make provision, between the rack 5 and the cavity 4, for slight friction or for an elastic tappet to keep the rack closed. In this case, beneath the rack, there is a tab by which it can be removed. Furthermore, the rack is preferably pierced, at its bottom, with a through hole 18 enabling the removal of the token 8.

Figure 3:
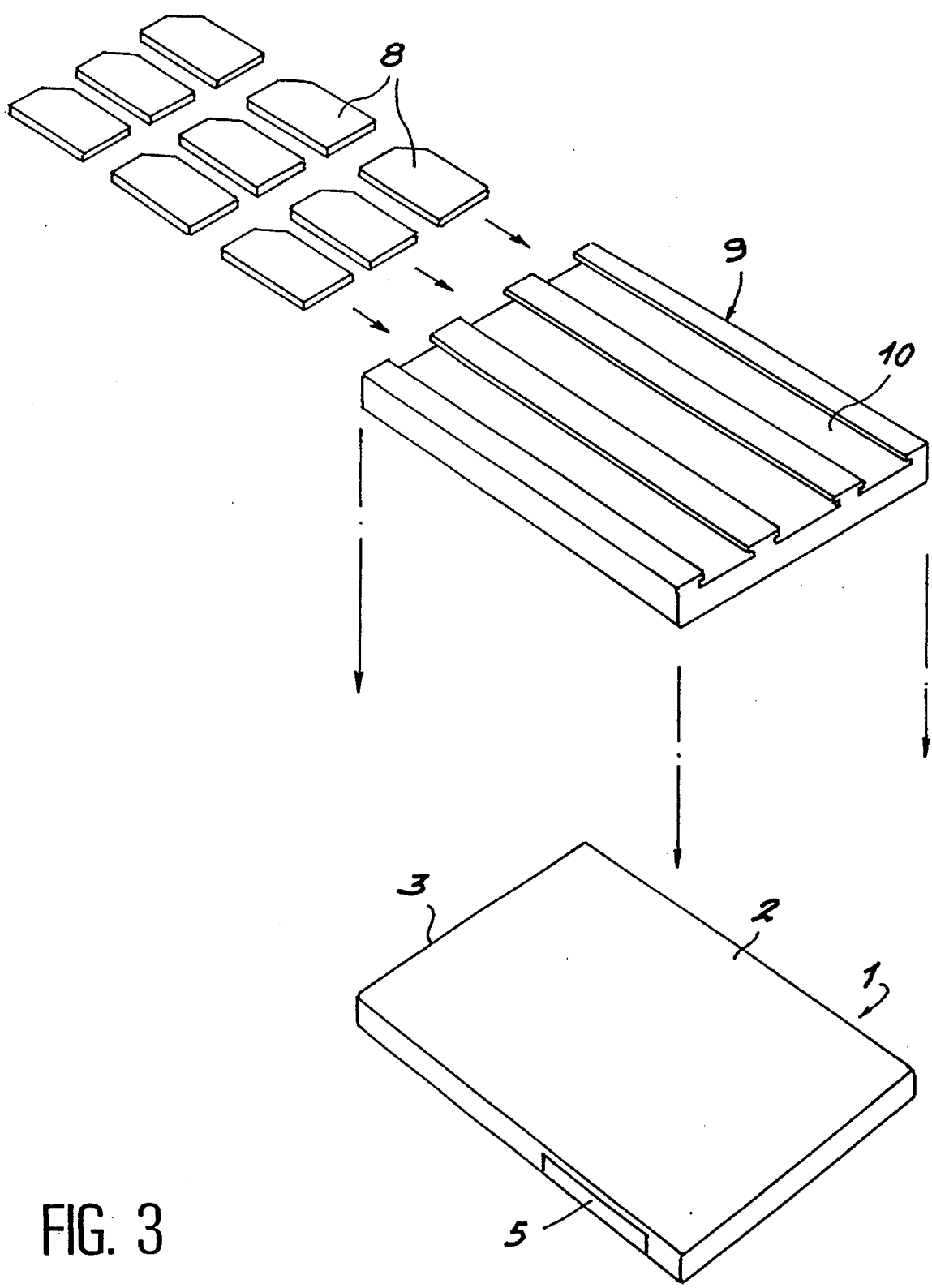
FIG. 3 illustrates the superimposition, on a portable card according to the invention, of a lid with slideways and a set of tokens.

As illustrated in FIGS. 2 and 3, the card 1 may receive a lid 9 provided with receptacles 10 designed to receive chips which are each supported by a token 8.

This lid 9 is capable of covering one of the main faces of the PCMCIA card. It advantageously has a length slightly smaller than the length of the card, so as to leave the first connector 3 uncovered. The lid 9 advantageously gets clipped to the PCMCIA card by every means commonly available to those skilled in the art, such as small hooks, shoulders etc., which shall not be described herein. According to another embodiment, the lid 9 may include a slideway into which the PCMCIA card will be inserted. Furthermore, this lid 9 may be fixed to a bottom constituting a box designed to receive the PCMCIA card.

The receptacles shown in FIG. 2 are cavities which are, for example, rubber-lined or provided with flexible edges adapted to the positioning of the chips 7 supported by their tokens 8, by being clipped on by hand. The lid 9 according to the invention has nine tokens at most. Furthermore, the bottom of each receptacle 10 advantageously has a hole 11, for example a circular hole, to enable a token to be grasped.

By contrast, the receptacles 10 shown in FIG. 3 are formed by slideways. The lid 9 has, for example, three slideways each designed to receive three tokens 8.

In the above-mentioned two cases, the thickness of the portable card covered with its lid will be only slightly greater than 3+0.8=3.8 mm. In practice, it is smaller than 6 mm. Such a thickness, which is far smaller than the 10.2 mm estimated here above, remains within proportions that are acceptable to a user.

With regard to the functional aspect of the invention, we shall consider a user provided with a portable card according to the invention seeking to implement the specified application of a chip borne by a token 8 of the lid 9. This user will have to remove the lid 9 of the PCMCIA card, select the appropriate token on the lid 9, recover this token, open the rack 5, insert the token 8 into this rack and close the rack again before inserting the card into the reader.

The tokens 8 preferably include particular inscriptions or logos, enabling the immediate selection of the token corresponding to the desired application.

After the lid has been removed, a token 8 is recovered either by making it slide into its receptacle (as in the case of FIG. 3) or by applying slight pressure by the finger through the hole 11 in order to unclip it (as in the case of FIG. 2).

Once the selected chip has been recovered, it is enough to open the rack 5, for example by using the finger-nails, to insert the token 8 into the housing 6 and then close said rack 5. The rack 5 is opened and closed in a direction substantially crosswise to the plane formed by the edge of the card comprising said rack 5. The rack 5 always remains fixedly joined to the pack 2, even when it is opened. The bevelled edge of the housing 6 can be used to orient the token 8 accurately. This corner is used as a position-correcting feature.

Depending on whether the second connector is positioned at the bottom of the rack or in the cavity, the connection between the eight pads of the chip 7 forming the metallizations 15 and the active elements of the PLMCIA card and between these active elements and the first connector 3 will be done respectively on the rack 5 or in the cavity 4.

However, one problem remains: that of limiting the wearing out of the metallizations 15 of the token 8. Indeed, in the case of the proposed approach where the metallizations 15 are pointed upwards during the positioning of the token 8 (right-hand part of FIG. 1B), the fact of inserting the token 8 into the card and removing it therefrom several times leads to the scratching of the metallizations 15 when the rack 5 is closed, through the passage of these metallizations 15 under the flexible and protruding contacts 19 located beneath the ceiling of the cavity 4. In practice, it has been observed that the scratches are all the deeper, and detrimental to the preservation of the token 8 as the flexible and protruding contacts 19 need to have a wide range of play to compensate for the clearances needed on each side of the token 8 during its insertion. It has then been realized then that the making of a rack 5 with a bottom 6 would make it possible to limit these clearances to just one greater clearance. Consequently, it has been possible to limit the protrusion of the contacts and obtain a card that scratches the metallizations of the token 8 to a lesser extent. Of course, the bottom of the rack 5 in itself prevents the removal of the token 8, unless there is a removal hole 18.

The card could then be plugged into the reader and the chip 7 will be in direct communication with the personal computer.

In order to improve safety, the PCMCIA card may advantageously comprise a system for the recognition of the carrier such as a recognition system or a system using an identification code.

For the implementation of the invention, the portable card could include tokens with different functions, for example a phone token, a health token, a television token, a video games token and an identification token. The mass storage memory may be used for different applications, in combination with the associated tokens.

The telephone token would be used to make telephone calls according to a given number of units. Furthermore, memories associated with the microprocessor of the PCMCIA card would then advantageously contain a customized directory.

The health token could be used, for example, to make medical payments while the PCMCIA card would contain the medical card of its bearer, along with emergency numbers.

The television token would be used notably in cases of subscriber television. The memory of the PCMCIA card would contain the following elements together: the week's television programs, the user's preferences and subscriptions pending validation.

The video games token would enable the purchase of games through a computer network. Said games would then be immediately integrated into the mass-storage memory of the PCMCIA card, possibly in compacted form.

The identification token would enable access to network-distributed information elements, or physical access to premises. In the latter case, the PCMCIA card would at the same time contain a transmission antenna for contact-free access.

Naturally, numerous applications are possible. Each application can use the mass-storage memory of the PCMCIA card to store data elements that may or may not be secured, as desired by the user. If, in addition, the then secured memory of the microprocessor comprises codes for access to the services of the different chips, the far too frequent memory lapses of habitual users would then be of no consequence.

What is claimed is:

1. A multi-applications portable card adapted for being plugged into a reader of a personal computer, said card comprising:

a card pack, the pack having a cavity formed therein, a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token: and a second connector electronically linked to the first connector, the second connector being adapted for connecting the card to the token.

2. A portable card according to claim 1, wherein the dimensions of the token are contained in a parallelepiped about 15 mm wide, 25 mm long and 0.8 mm thick.

3. A multi-applications portable card adapted for being plugged into a reader of a personal computer, said card comprising:

a card pack, the pack having a cavity formed therein, a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token, the dimensions of the token being contained in a parallelepiped about 15 mm wide, 25 mm long, and 0.8 mm thick, and a second connector electronically linked to the first connector, the second connector being adapted for connecting the card to the token, and wherein the second connector is located against a ceiling of the cavity.

4. A portable card according to claim 3, wherein the second connector is a feeler connector connected by fixed wires to the first connector.

5. A multi-applications portable card adapted for being plugged into a reader of a personal computer, said card comprising:

a card pack, the pack having a cavity formed therein, a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token, the dimensions of the token being contained in a parallelepiped about 15 mm wide, 25 mm long, and 0.8 mm thick, and a second connector electronically linked to the first connector, the second connector being adapted for connecting the card to the token, and wherein the second connector is fixed to the bottom of the rack.

6. A portable card according to claim 5, wherein said card is based on the PCMCIA format.

7. A portable card according to claim 6, wherein the rack has a hole formed therein for disengaging the token from the housing.

8. A portable card according to claim 7, further comprising a lid, the lid being attached to the card adjacent a face of the card and the lid being provided with receptacles for storing a plurality of additional tokens.

9. A portable card according to claim 8, wherein the receptacles are adapted for slidably receiving the tokens.

10. A portable card according to claim 8, wherein the receptacles are formed of cavities, wherein the receptacles have flexible shoulders for receiving the tokens through their being clipped on by hand, and wherein the receptacles have holes formed therein enabling the removal of the tokens.

11. A portable card according to claim 10, wherein the receptacles are adapted for storing nine tokens.

12. A portable card according to claim 11, wherein the card further comprises a microprocessor, and wherein the microprocessor includes a mechanism for the recognition of the bearer.

13. A portable card according to claim 12, wherein the microprocessor comprises a secured memory, and wherein the secured memory comprises the codes providing access to the services of the tokens.

14. A portable card according to claim 13, wherein the card has a memory, and wherein the memory is used for a plurality of different applications, each particular application being used in combination with a token associated with that particular application.

15. A multi-applications portable card adapted for being plugged into a reader of a personal computer, said card comprising:

a card pack, the pack having a cavity formed therein, a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token, and a second connector electronically linked to the first connector, the second connector being adapted for connecting the card to the token, and wherein the second connector is located against a ceiling of the cavity.

16. A multi-applications portable card adapted for being plugged into a reader of a personal computer, said card comprising:

a card pack, the pack having a cavity formed therein, a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token, and a second connector electronically linked to the first connector, the second connector being adapted for connecting the card to the token, and wherein the second connector is a feeler connector connected by fixed wires to the first connector.

17. A multi-applications portable card adapted for being plugged into a reader of a personal computer, said card comprising:

a card pack, the pack having a cavity formed therein.

a first connector adapted for connecting the card to the reader, the first connector being positioned on the periphery of the pack, a mobile rack, the mobile rack being positioned on an edge of the card, the mobile rack being insertable into the cavity of the pack, and the mobile rack comprising a housing provided with a bottom, the housing being adapted for receiving a chip borne by a token, and a second connector electronically linked to the first connector, the second connector being adapted for connecting the card to the token, and wherein the second connector is fixed to the bottom of the rack.

18. A portable card according to claim 1, wherein the rack has a hole formed therein for disengaging the token from the housing.

19. A portable card according to claim 1, further comprising a lid, the lid being attached to the card adjacent a face of the card, and the lid being provided with receptacles for storing a plurality of additional tokens.

20. A portable card according to claim 19, wherein the receptacles are adapted for storing nine tokens.

21. A portable card according to claim 5, wherein the second connector is connected by flexible conductive wires to the first connector.

22. A portable card according to claim 3, wherein the card is based on the PCMCIA format.

23. A portable card according to claim 22, wherein the rack has a hole formed therein for disengaging the token from the housing.

24. A portable card according to claim 23, further comprising a lid, the lid being attached to the card adjacent a face of the card and the lid being provided with receptacles for storing a plurality of additional tokens.

25. A portable card according to claim 24, wherein the receptacles are adapted for slidably receiving the tokens.

26. A portable card according to claim 24, wherein the receptacles are formed of cavities, wherein the receptacles have flexible shoulders for receiving the tokens through their being clipped on by hand, and wherein the receptacles have holes formed therein enabling the removal of the tokens.

27. A portable card according to claim 26, wherein the receptacles are adapted for storing nine tokens.

28. A portable card according to claim 27, wherein the card comprises a microprocessor, and wherein the microprocessor includes a mechanism for the recognition of the bearer.

29. A portable card according to claim 28, wherein the microprocessor comprises a secured memory, and wherein the secured memory comprises the codes providing access to the services of the tokens.

30. A portable card according to claim 29, wherein the card has a memory, and wherein the memory is used for a plurality of different applications, each particular application being used in combination with a token associated with that particular application.

31. A portable card according to claim 17, wherein the second connector is connected by flexible conductive wires to the first connector.

32. A portable card according to claim 1, wherein the card is based on the PCMCIA format.

33. A portable card according to claim 19, wherein the receptacles are adapted for slidably receiving the tokens.

34. A portable card according to claim 19, wherein the receptacles are formed cavities, wherein the receptacles have flexible shoulders for receiving the tokens through their being clipped on by hand, and wherein the receptacles have holes formed therein enabling the removal of the tokens.

35. A portable card according to claim 1, wherein the card comprises a microprocessor, and wherein the microprocessor includes a mechanism for the recognition of the bearer.

36. A portable card according to claim 1, wherein the secured memory of the microprocessor comprises the codes providing access to the services of the tokens.

37. A portable card according to claim 1, wherein the card has a memory, and wherein the memory is used for a plurality of different applications, each particular application being used in combination with a token associated with that particular application.

* * * * *